United States Patent [19]

Shaffer

[11] Patent Number: 6,008,307
[45] Date of Patent: *Dec. 28, 1999

[54] PROCESS FOR PRODUCING OLEFIN POLYMERS USING CATIONIC CATALYSTS

[75] Inventor: Timothy Daniel Shaffer, Dickinson, Tex.

[73] Assignee: Exxon Chemical Patents Inc, Houston, Tex.

[*] Notice: This patent is subject to a terminal disclaimer.

[21] Appl. No.: 08/234,782

[22] Filed: Apr. 28, 1994

[51] Int. Cl.[6] .................................. C08F 4/52; C08F 4/16; C08F 10/10
[52] U.S. Cl. .................... 526/190; 526/89; 526/134; 526/170; 526/171; 526/183; 526/185; 526/192; 526/193; 526/194; 526/196; 526/198; 526/204; 526/217; 526/332; 526/348.7
[58] Field of Search .................................. 526/134, 170, 526/171, 89, 183, 190, 193, 194, 196, 198, 185, 192, 221, 204, 217, 348.7; 585/520, 525, 527, 942

[56] References Cited

U.S. PATENT DOCUMENTS

| | | | |
|---|---|---|---|
| 3,631,002 | 12/1971 | Brownstein | 526/221 X |
| 4,808,680 | 2/1989 | Schmidt et al. . | |
| 5,026,798 | 6/1991 | Canich . | |
| 5,045,517 | 9/1991 | Campbell, Jr. et al. . | |
| 5,064,802 | 11/1991 | Stevens et al. | 526/170 X |
| 5,066,741 | 11/1991 | Campbell, Jr. . | |
| 5,084,586 | 1/1992 | Farooq | 556/181 |
| 5,153,157 | 10/1992 | Hlatky et al. | 502/117 |
| 5,169,914 | 12/1992 | Kaszas et al. | 526/147 X |
| 5,196,490 | 3/1993 | Campbell, Jr. et al. . | |
| 5,198,401 | 3/1993 | Turner et al. | 502/155 |
| 5,219,948 | 6/1993 | Storey et al. | 525/270 X |
| 5,223,468 | 6/1993 | Razavi . | |
| 5,223,591 | 6/1993 | Nyander et al. | 526/204 |
| 5,241,025 | 8/1993 | Hlatky et al. | 526/129 |
| 5,278,119 | 1/1994 | Turner et al. . | |
| 5,296,433 | 3/1994 | Siedle et al. | 526/134 X |
| 5,330,948 | 7/1994 | Marks et al. | 526/134 X |
| 5,384,299 | 1/1995 | Turner et al. | 502/155 |
| 5,391,619 | 2/1995 | Turner et al. | 525/268 |
| 5,439,996 | 8/1995 | Baird et al. | 526/259 X |
| 5,448,001 | 9/1995 | Baird . | |
| 5,470,927 | 11/1995 | Turner et al. | 526/170 |

FOREIGN PATENT DOCUMENTS

| | | |
|---|---|---|
| 0 277 003 A1 | 8/1988 | European Pat. Off. . |
| 0277003 A1 | 8/1988 | European Pat. Off. . |
| 0277004 A1 | 8/1988 | European Pat. Off. . |
| 0 496 193 A1 | 7/1992 | European Pat. Off. . |
| 0 505 973 A2 | 9/1992 | European Pat. Off. . |
| 0 505 997 A2 | 9/1992 | European Pat. Off. . |
| 0 554 674 A1 | 8/1993 | European Pat. Off. . |
| 0 573 120 A1 | 12/1993 | European Pat. Off. . |
| 0573403 A2 | 12/1993 | European Pat. Off. . |
| WO 93/21238 | 10/1993 | WIPO . |
| WO 95/05405 | 2/1995 | WIPO . |
| WO 95/17942 | 3/1995 | WIPO . |

OTHER PUBLICATIONS

Kirk–Othmer, *Enclopedia of Chemical Technology*, Third Edition, vol. 20, "Refractories to Silk," p. 655.

Patent Abstracts of Japan, vol. 16, No. 479 (C–00992), Oct. 6, 1992 & JP, A, 04 175303 (Dainippon Ink & Chem Ind) Jun. 23, 1992—abstract.

Journal of Polymer Science Part A: Polymer Chemistry Edition, vol. 32, No. 4, Mar. 1994 New York, pp. 661–673, XP 000424277 Ricardo Fierro 'Syndioselective propylene polymerization . . . ' see p. 668, col. 2.

"Tetrakis(pentafluorophenyl)borate: A New Anion for Silylium Cations in the Condensed Phase" Joseph B. Lamber and Zhizhong Zhang, J. Chem. Soc., Chem. Commun., 1993, pp. 383–384.

"Isospecific Polymeriation of Propylene Catalyzed by rac–Ethylenebis(indenyl)methylzirconium 'Cation'" James C.W. Chien, Woei–Min Tsai and Marvin D. Rausch, J. Am. Chem. Soc. 1991, 113, pp. 8570–8571.

Journal of American Chem. Soc. vol. 16, #14, Jul. 13, 1994 pp. 6435–6436.

Pellecchia et al, Novel Aluminoxane–Free Catalysts for Syndiotactic–Specific Polymerization of Styrene, Makromal. Chem., Rapid Communc., 13, 265–268 (1992).

*Primary Examiner*—Fred Teskin
*Attorney, Agent, or Firm*—Brent M. Peebles; Myron B. Kurtzman; Catherine L. Bell

[57] ABSTRACT

A cationic catalyst composition comprising a reactive cation and a compatible non-coordinating anion used at a temperature of 20° C. or less to produce olefin polymers, particularly polyisobutylene is disclosed.

36 Claims, 2 Drawing Sheets

PROCESS FOR PRODUCING OLEFIN POLYMERS USING CATIONIC CATALYSTS

FIELD OF THE INVENTION

This invention relates to a method for the cationic polymerization of olefins using catalysts comprising a cation and a compatible non-coordinating anion. This invention further relates to the use of complexes containing a compatible non-coordinating anion to initiate cationic polymerization.

BACKGROUND OF THE INVENTION

The cationic polymerization of olefins is typically conducted in the presence of catalyst systems comprising a Lewis acid, a tertiary alkyl initiator molecule containing a halogen, ester, ether, acid or alcohol group and occasionally an electron donor molecule such as ethyl acetate. The exact combination of the components varies with each system. The tertiary alkyl initiators used in these systems are used for living and non-living carbocationic catalysts. The tertiary alkyl initiators are typically represented by the formula:

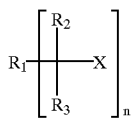

wherein $R_1$, $R_2$, and $R_3$ are a variety of alkyl or aromatic groups or combinations thereof, n is the number of initiator molecules and X is the functional group on which the Lewis acid affects a change to bring about the carbocationic initiating site. This group is typically a halogen, ester, ether, alcohol or acid group depending on the Lewis acid employed. One or two functional groups per initiator tend to lead to linear polymers while three or more tend to lead to star polymers.

Catalyst systems based on halogens and/or alkyl containing Lewis acids, such as boron trichloride and titanium tetrachloride, use various combinations of the above components and typically have similar process characteristics. For living polymerization systems, Lewis acid concentrations must exceed the concentration of initiator sites by 16 to 40 times in order to achieve 100 percent conversion in 30 minutes (based upon a degree of polymerization equal to 890) at −75 to −80° C.

In nonliving polymerizations, high molecular weight polyisobutylenes are only prepared at low temperatures (−60 to −100° C.) and at catalyst concentrations exceeding one catalyst molecule per initiator molecule. Frequently, these catalysts are restricted in their use to certain narrow temperature regions and concentration profiles. An improved catalyst could be used stoichiometrically rather than in excess to provide enough initiation sites over a wide range of temperatures without affecting its suitability.

Furthermore a new class of catalysts utilizing compatible non-coordinating anions in combination with cyclopentadienyl transition metal compounds has recently been disclosed by Turner and Hlatkey in U.S. Ser. Nos., 542,235, filed Jun. 22, 1990; U.S. Pat. No. 5,153,157; U.S. Pat. No. 5,198,401; and European Patent Applications 520 732, published Dec. 20, 1992; 277 003 & 277 004, each published Jun. 3, 1988. This system polymerizes olefins using a coordination mechanism in non-polar solvents. U.S. Pat. Nos. 5,196,490, 5,066,741 and 4,808,680 disclose the preparation of syndiotactic polystyrene or vinyl aromatics using non-coordinating anions in combination with cyclopentadienyl transition metal derivatives at coordination catalysis conditions.

It is desirable that a new catalyst system utilizing compatible non-coordinating anions in polar or non-polar solvent be produced that can polymerize olefins heretofore only polymerizable by cationic catalyst as well as typical monomers polymerized by coordination catalysis, preferably at the same time.

SUMMARY OF THE INVENTION

This invention relates in part to the discovery that a non-coordinating anion can be combined with different compositions to form cationic polymerization catalyst systems. In addition this invention further relates to the discovery that monomer choice will typically determine the reaction mechanism (coordination versus cationic) for catalyst systems comprising a cyclopentadienyl transition metal derivative and a compatible non-coordinating anion.

Therefore, in accordance with this invention, there is provided a cationic polymerization catalyst system, a method for cationic polymerization using a catalyst system which comprises a compatible non-coordinating anion. Another aspect of the invention is directed toward certain novel catalyst systems for cationic polymerization and a method of using this catalyst system for the polymerization of cationically polymerizable olefins. A particularly desirable aspect is the polymerization by both coordination mechanism and cationic mechanism at the same time.

DESCRIPTION OF PREFERRED EMBODIMENTS

Figure 1:
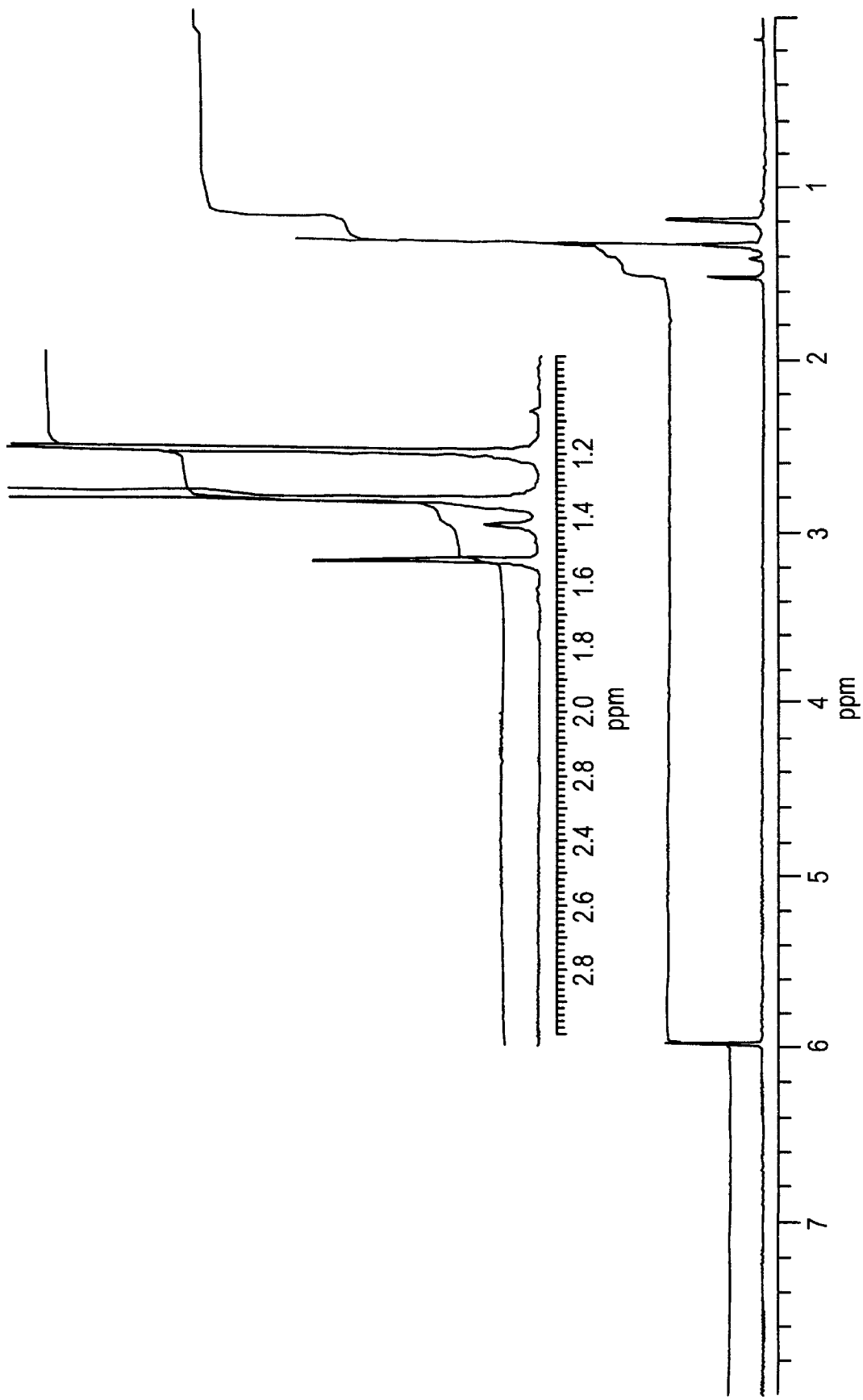
FIG. 1 is a $^1$H-NMR of Fraction C of sample 158-3.

This invention relates to a method for cationic polymerization which utilizes a catalyst composition comprising a reactive cation and a compatible non-coordinating anion. The catalyst composition comprising the compatible non-coordinating anion will include a reactive cation and in certain instances are novel catalyst systems. A reactive cation is any cation that can react with an olefin to create a carbocationic polymerization site.

A "compatible non-coordinating anion," (hereinafter "NCA") is defined to be an anion which either does not coordinate the cation or which is only weakly coordinated to the cation thereby remaining sufficiently labile to be displaced by an olefin monomer. Further the phrase "compatible non-coordinating anion" specifically refers to an anion which when functioning as a stabilizing anion in the catalyst systems of this invention does not irreversibly transfer an anionic substituent or fragment thereof to the cation thereby forming a neutral by product or other neutral compound. Compatible non-coordinating anions are anions which are not degraded to neutrality when the initially formed complex decomposes. Preferred examples of such compatible non-coordinating anions include: alkyltris(pentafluorophenyl)boron $(RB(pfp)_3^-)$, tetraperfluorophenylboron $(B(pfp)_4^-)$, tetraperflourophenylaluminum, carboranes, halogenated carboranes and the like. Hereinafter the use of the phrase NCA or non-coordinating anion means the compatible non-coordinating anions described above.

This catalyst system can be used, among other things, for the cationic polymerization of olefins, especially traditional cationically polymerizable olefins, particularly geminally disubstituted olefins. Certain of these catalyst systems can also be used to polymerize both cationically polymerizable monomers and typical coordination polymerizable monomers.

For ease of description the formulae presented below depict the catalyst components in the "ionic" state. One of ordinary skill in the art will realize that many of these components are not stable as depicted and are obtained from a neutral stable form. For example.

typically does not exist in this state. (Rather it is formed by reacting $Cp_2ZrMe_2$ with another compound that will abstract an Me group.) This convention of describing the components in "ionic" form is used for descriptive purposes only and should not be construed as limiting in any way.

For lists describing the neutral stable forms of the cyclopentadienyl transition metal compositions and the NCA see European Patent Application ("EPA") 129 368, published Dec. 27, 1984; U.S. Pat. No. 5,055,438; U.S. Ser. No. 07/542,235, filed Jun. 22, 1990; EPA 520 732, published Dec. 30, 1992; U.S. Pat. No. 5,017,714; U.S. Pat. No. 5,198,401; U.S. Pat. No. 5,153,157; EPA 277 003 and 277 004, published Aug. 5, 1992, all of which are incorporated by reference herein. It has been noted however, that the analinium containing compounds have an inhibiting effect on the carbocationic polymerization.

For lists describing the neutral stable forms of the substituted carbocations see U.S. Pat. No. 4,910,321; U.S. Pat. No. 4,929,683; and EPA 341 012. In general the neutral stable form is typically represented by the formula:

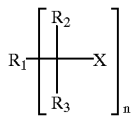

wherein $R_1$, $R_2$, and $R_3$ are a variety of alkyl or aromatic groups or combinations thereof, n is the number of initiator molecules and is preferably greater than or equal to 1, even more preferably between 1 and 30, and X is the functional group on which the Lewis acid affects a change to bring about the carbocationic initiating site. This group is typically a halogen, ester, ether, alcohol or acid group depending on the Lewis acid employed.

For a description of stable forms of the substituted silylium, see F. A. Cotton, G. Wilkinson, Advanced Inorganic Chemistry, John Wiley and Sons, New York 1980. Likewise for stable forms of the cationic tin, germanium and lead compositions see Dictionary of organometallic compounds, Chapman and Hall New York 1984.

Catalyst System
General Description

Catalyst systems of this invention generally comprise two components: a reactive cation and a campatible non-coordinating anion. The anion may be combined with the cation by any method known to those of ordinary skill in the art. For example, a composition containing the NCA fragment is first treated to produce the anion in the presence of the reactive cation or reactive cation source, i.e. the anion is activated. Likewise the NCA may be activated without the presence of the reactive cation or cation source which is subsequently introduced. In a preferred embodiment a composition containing the anion and a composition containing the reactive cation are combined and allowed to react to form a by product, the anion and the cation. In another preferred embodiment the NCA is introduced into the solvent as a compound containing both the anion and the cation in the form of the active catalyst system.

Non-Coordinating Anions

A preferred class of compatible non-coordinating anions includes chemically stable, non-nucleophilic substituted anionic complexes having a molecular diameter of about 4 Angstroms or more.

Any metal or metalloid compound capable of forming an anionic complex which is resistant to irreversibly transferring a substituent or fragment to the cation to neutralize the cation to produce a neutral molecule may be used as the NCA. In addition any metal or metalloid capable of forming a coordination complex which is stable in water may also be used or contained in a composition comprising the anion. Suitable metals include, but are not limited to aluminum, gold, platinum and the like. Suitable metalloids include, but are not limited to, boron, phosphorus, silicon and the like. Compounds containing anions which comprise coordination complexes containing a single metal or metalloid atom are, of course, well known and many, particularly such compounds containing a single boron atom in the anion portion, are available commercially. In light of this, salts containing anions comprising a coordination complex containing a single boron atom are preferred.

In general, preferred NCAs may be represented by the following general formula:

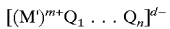

wherein:

M' is a metal or metalloid;

$Q_1$ to $Q_n$ are, independently, bridged or unbridged hydride radicals, dialkylamido radicals, alkoxide and aryloxide radicals, hydrocarbyl and substituted-hydrocarbyl radicals, halocarbyl and substituted-halocarbyl radicals and hydrocarbyl and halocarbyl-substituted organometalloid radicals and any one, but not more than one of $Q_1$ to $Q_n$ may be a halide radical;

m is an integer representing the formal valence charge of M;

n is the total number of ligands Q, and d is an integer greater than or equal to 1.

It is of course understood that the anions described above and below may be counter balanced with a positively charged component that is removed before the anion acts with the cation.

In a preferred embodiment M' is boron, n=4, $Q_1$ and $Q_2$ are the same or different aromatic or substituted-aromatic hydrocarbon radicals containing from about 6 to about 20 carbon atoms and may be linked to each other through a stable bridging group; and $Q_3$ and $Q_4$ are, independently, hydride radicals, hydrocarbyl and substituted-hydrocarbyl radicals, halocarbyl and substituted-halocarbyl radicals, hydrocarbyl- and halocarbyl-substituted organometalloid radicals, disubstituted pnictogen radicals, substituted chalcogen radicals and halide radicals, with the proviso that $Q_3$ and $Q_4$ will not be halide at the same time.

Illustrative, but not limiting, examples of boron components which may be used as NCAs are: tetra-valent boron compounds such as tetra(phenyl)boron, tetra(p-tolyl)boron, tetra(o-tolyl)boron, tetra(pentafluorophenyl)boron, tetra(o, p-dimethylphenyl)boron, tetra(m,m-dimethylphenyl)boron, (p-tri-fluoromethylphenyl)boron and the like.

In a particularly preferred embodiment M=boron, n=4, $Q_1$, $Q^2$ and $Q_3$ are each ($C_6F_5$) and $Q_4$ is as defined above. Illustrative but not limiting, examples of these preferred NCAs comprising boron triphenylmethyl salts where Q is a simple hydrocarbyl such as methyl, butyl, cyclohexyl, or phenyl or where Q is a polymeric hydrocarbyl of indefinite chain length such as polystyrene, polyisoprene, or polyparamethylstyrene.

Another preferred class of NCAs is that class comprising those NCA containing a plurality of boron atoms, including boranes and carboranes.

Illustrative, but not limiting, examples of NCAs include:
carboranes such as dodecaborate, decachlorodecaborate, dodecachlorododecaborate, 1-carbadecaborate, 1-carbadecaborate, 1-trimethylsilyl-1-carbadecaborate;

Borane and carborane complexes and salts of borane and carborane anions such as decaborane(14), 7,8-dicarbadecaborane(13), 2,7-dicarbaundecaborane(13), undecahydrido-7,8-dimethyl-7,8-dicarbaundecaborane, 6-carbadecaborate(12), 7-carbaundecaborate, 7,8-dicarbaudecaborate; and Metallaborane anions such as bis(nonahydrido-1,3-dicarbanonaborato)cobaltate(III), bis(undecahydrido-7,8-dicarbaundecaborato) ferrate(III), bis(undecahydrido-7,8-dicarbaundecaborato) cobaltate (III), bis(undecahydrido-7,8-dicarbaunaborato) nikelate(III), bis(nonahydrido-7,8-dimethyl-7,8-dicarbaundecaborato)ferrate(III), bis(tribromooctahydrido-7,8-dicarbaundecaborato) cobaltate(III), bis(undecahydridodicarbadodecaborato) cobaltate(III) and bis(undecahydrido-7-carbaundecaborato) cobaltate(III).

The NCA compositions most preferred for forming the catalyst system used in this process are those containing a tris-perfluorophenyl boron, tetrapentafluorphenyl boron anion and/or two or more tripentafluorophenyl boron anion groups covalently bond to a central atomic molecular or polymeric complex or particle.

Cationic Component

In various preferred embodiments of this invention the NCA is combined with one or more cations that are selected from different classes of cations and cation sources.

Some preferred classes are:
(A) cyclopentadienyl transition metal complexes and derivatives thereof.
(B) a substituted carbocation whose composition is represented by the formula:

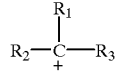

wherein $R_1$, $R_2$ and $R_3$ are hydrogen, alkyl, aryl, aralkyl groups or derivatives thereof, preferably $C_1$ to $C_{30}$ alkyl, aryl, aralkyl groups or derivatives thereof, provided that only one of $R_1$, $R_2$ and $R_3$ may be hydrogen at any one time;
(C) substituted silylium; preferably those represented by the formula:

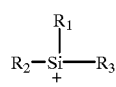

wherein $R_1$, $R_2$ and $R_3$ are hydrogen, alkyl, aryl, aralkyl groups or derivatives thereof, preferably $C_1$ to $C_{30}$ alkyl, aryl, aralkyl groups or derivatives thereof, provided that only one of $R_1$, $R_2$ and $R_3$ may be hydrogen at any one time;
(D) compositions capable of generating a proton; and
(E) cationic compositions of germanium, tin or lead, some of which are represented by the formula:

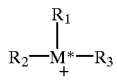

wherein $R_1$, $R_2$ and $R_3$ are hydrogen, alkyl, aryl, aralkyl groups or derivatives thereof, preferably $C_1$ to $C_{30}$ alkyl, aryl, aralkyl groups or derivatives thereof, and $M^*$ is Ge, Sn or Pb, provided that only one of $R_1$, $R_2$ and $R_3$ may be hydrogen at any one time.

A. Cyclopentadienyl Metal Derivatives

Preferred cyclopentadienyl transition metal derivatives include transition metals that are a mono-, bis- or tris-cyclopentadienyl derivative of a Group 4, 5 or 6 transition metal, preferably a mono-cyclopentadienyl (Mono-Cp) or bis-cyclopentadienyl (Bis-Cp) Group 4 transition metal compositions, particularly a zirconium, titanium or hafnium compositions.

Preferred cyclopentadienyl derivatives (cation sources) that may be combined with non-coordinating anions are represented by the following formulae:

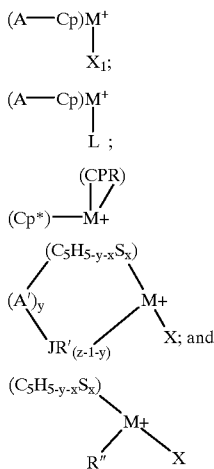

wherein:
(A—Cp) is either (Cp) (Cp*) or Cp-A'-Cp*;
Cp and Cp* are the same or different cyclopentadienyl rings substituted with from zero to five substituent groups S, each substituent group S being, independently, a radical group which is a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radicals, or Cp and Cp* are cyclopentadienyl rings in which any two adjacent S groups are joined forming a $C_4$ to $C_{20}$ ring system to give a saturated or unsaturated polycyclic cyclopentadienyl ligand;
R is a substituent on one of the cyclopentadienyl radicals which is also bonded to the metal atom;
A' is a bridging group, which group may serve to restrict rotation of the Cp and Cp* rings or ($C_5H_{5-y-x}S_x$) and $JR'_{(z-1-y)}$ groups;

M is a Group 4, 5, or 6 transition metal;

y is 0 or 1;

$(C_5H_{5-y-x}S_x)$ is a cyclopentadienyl ring substituted with from zero to five S radicals;

x is from 0 to 5 denoting the degree of substitution;

$JR'_{(z-1-y)}$ is a heteroatom ligand in which J is a Group 15 element with a coordination number of three or a Group 16 element with a coordination number of 2, preferably nitrogen, phosphorus, oxygen or sulfur;

R" is a hydrocarbyl group, preferably an alkyl group;

X and $X_1$ are independently a hydride radical, hydrocarbyl radical, substituted hydrocarbyl radical, halocarbyl radical, substituted halocarbyl radical, and hydrocarbyl- and halocarbyl-substituted organometalloid radical, substituted pnictogen radical, or substituted chalcogen radicals; and L is an olefin, diolefin or aryne ligand, or a neutral Lewis base.

Additional cyclopentadienyl compounds that may be used in this invention are described in U.S. patent application Ser. Nos. 133,480; and 542,236, and U.S. Pat. Nos. 5,055,438, 5,278,119, 5,198,401 and 5,096,867, which are incorporated by reference herein.

B. Substituted Carbocation Cations

Another preferred source for the cation is substituted carbocations. Preferred examples include substances that are represented by the formula:

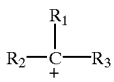

wherein $R_1$, $R_2$ and $R_3$ are independently hydrogen, or a linear, branched or cyclic aromatic or aliphatic groups, preferably a $C_1$ to $C_{20}$ aromatic or aliphatic group, provided that only one of $R_1$, $R_2$ or $R_3$ may be hydrogen. In a preferred embodiment none of $R_1$, $R_2$ or $R_3$ are H. Preferred aromatics include phenyl, toluyl, xylyl, biphenyl and the like. Preferred aliphatics include methyl, ethyl, propyl, butyl, pentyl, hexyl, octyl, nonyl, decyl, dodecyl, 3-methylpentyl, 3,5,5-trimethylhexyl and the like. In a particularly preferred embodiment, when $R_1$, $R_2$ and $R_3$ are phenyl groups, the addition of an aliphatic or aromatic alcohol significantly enhances the polymerization of isobutylene.

C. Substituted Silylium Cations

In another preferred embodiment, substituted silylium compositions, preferably trisubstituted silylium compositions are combined with NCA's to polymerize monomers. Preferred silylium cations are those represented by the formula:

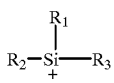

wherein $R_1$, $R_2$ and $R_3$ are independently hydrogen, a linear, aromatic or aliphatic group, provided that only one of $R_1$, $R_2$ and $R_3$ is hydrogen, preferably none of $R_1$, $R_2$ and $R_3$ is hydrogen. Preferred aromatics include phenyl, toluyl, xylyl, biphenyl and the like. Preferred aliphatics include methyl, ethyl, propyl, butyl, pentyl, hexyl, octyl, nonyl, decyl, dodecyl, 3-methylpentyl, 3,5,5-trimethylhexyl and the like. In a particularly preferred embodiment $R_1$, $R_2$ and $R_3$ are $C_1$ to $C_{20}$ aromatic or aliphatic groups, with $C_1$ to $C_8$ alkyls being especially preferred. Preferred examples include trimethylsilylium, triethylsilylium, benzyldimethylsilylium, and the like.

D. Composition Capable of Generating a Proton

A fourth source for the cation is any compound that will produce a proton when combined with the non-coordinating anion or a composition containing a non-coordinating anion. Protons may be generated from the reaction of a stable carbocation salt which contains a non-coordinating, non-nucleophilic anion with water, alcohol or phenol present to produce the proton and the corresponding by-product, (ether in the case of an alcohol or phenol and alcohol in the case of water). Such reaction may be preferred in the event that the reaction of the carbocation salt is faster with the protonated additive as compared with its reaction with the olefin. Other proton generating reactants include thiols, carboxylic acids, and the like. Similar chemistries may be realized with silylium type catalysts. In another embodiment, when low molecular weight polymer product is desired an aliphatic or aromatic alcohol may be added to inhibit the polymerization.

Another method to generate a proton comprises combining a Group 1 or Group 2 metal cation, preferably lithium, with water, preferably in a wet, non-protic organic solvent, in the presence of a Lewis base that does not interfere with polymerization. A wet solvent is defined to be a hydrocarbon solvent partially or fully saturated with water. It has been observed that when a Lewis base, such as isobutylene, is present with the Group 1 or 2 metal cation and the water, a proton is generated. In a preferred embodiment the non-coordinating anion is also present in the "wet" solvent such that active catalyst is generated when the Group 1 or 2 metal cation is added.

E. Germanium, Tin and Lead Compositions

Another preferred source for the cation is substituted germanium, tin or lead cations. Preferred examples include substances that are represented by the formula:

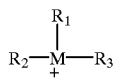

wherein $R_1$, $R_2$ and $R_3$ are independently hydrogen, or a linear, branched or cyclic aromatic or aliphatic groups, preferably a $C_1$ to $C_{20}$ aromatic or aliphatic group, provided that only one of $R_1$, $R_2$ or $R_3$ may be hydrogen and M is germanium, tin or lead. In a preferred embodiment none of $R_1$, $R_2$ or $R_3$ are H. Preferred aromatics include phenyl, toluyl, xylyl, biphenyl and the like. Preferred aliphatics include methyl, ethyl, propyl, butyl, pentyl, hexyl, octyl, nonyl, decyl, dodecyl, 3-methylpentyl, 3,5,5-trimethylhexyl and the like.

Active Catalyst System

A. Cyclopentadienyl Transition Metal Compounds

The Cp transition metal cations ($CpTm^+$) can be combined into an active catalyst in at least two ways. A first method is to combine a compound comprising the $CpTm^+$ with a second compound comprising the NCA which then react to form a by product and the active "non-coordinating" pair. Likewise, the $CpTm^+$ compound may also be directly combined with the NCA to form the active catalyst system. Typically the NCA is combined with the cation/cation source in ratios of 1 to 1, however ratios of 1 to 100 ($CpTm^+$ to NCA) also work in the practice of this invention.

Active cationic catalysts can be prepared by reacting a transition metal compound with some neutral Lewis acids, such as $B(C_6F_5)_{3n}$, which upon reaction with a hydrolyzable ligand (X) of the transition metal compound forms an anion, such as $([B(C_6F_5)_3(X)]^-)$, which stabilizes the cationic transition metal species generated by the reaction.

A novel aspect of this invention is the active carbocationic catalyst complex which is formed and which can be represented by the formulae:

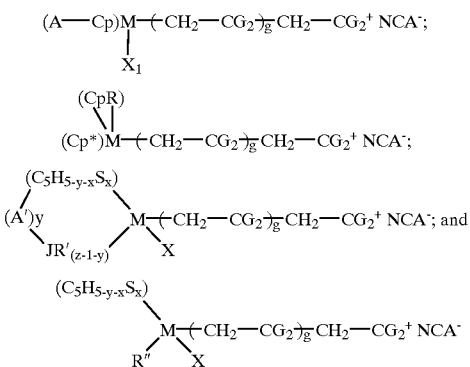

wherein each G is independently hydrogen or an aromatic or aliphatic group, preferably a $C_1$ to $C_{100}$ aliphatic group, and g is an integer representing the number of monomer units incorporated into the growing polymer chain, g is preferably a number greater than or equal to 1, preferably a number from 1 to about 150,000. $NCA^-$ is any non-coordinating anion as described above. All other symbols are as defined above.

A particularly novel aspect of this invention is an active catalyst composition that polymerizes both cationically and by coordination mechanism. In polymerization environment containing both coordination monomer and cationic monomer, as defined below, it has been found that a portion of the active catalyst acts as cationic catalyst and polymerizes the cationic monomer, a second portion of the catalyst acts a coordination catalyst and polymerizes coordination monomer, and a third portion of the catalyst polymerizes both cationic monomer and coordination monomer, apparently at two sites on the same growing polymer chain to produce copolymers, preferably block copolymers. Since block copolymers are produced, it appears that there is an intermediate catalyst structure between those that polymerize solely by cationic mechanism and those that polymerize solely by coordination mechanism. It has also been discovered that these cyclopentadienyl derivative NCA catalyst systems can be triggered to polymerize by a selected mechanism, i.e. cationic or coordination, by combining them with a cationic monomer or a coordination monomer, respectively.

In another embodiment this invention also provides active catalyst compositions which can be represented by the formulae:

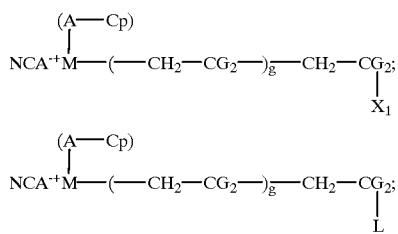

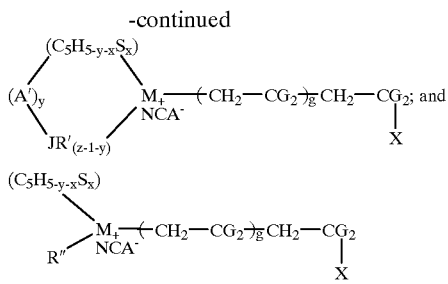

wherein each G is independently a aliphatic or aromatic group, preferably a $C_1$ to $C_{100}$ aliphatic or aromatic group, and g is a n integer representing the number of monomer units incorporated into the growing polymer chain, g is preferably a number greater than or equal to 1, preferably a number from 1 to about 50,000. $NCA^-$ is any non-coordinating anion as described above. All other symbols are as defined above.

B. Substituted Carbocation and Silylium Compounds

Generation of trisubstituted carbocations and silylium cations may be performed before use in the polymerization or in situ. Pre-formation and isolation of the cation or the stable cation salts may be accomplished by reacting the alkali or alkaline earth metal salt of the non-coordinating anion with the corresponding halogen of the potential carbocation or silylium similarly to methods known in the art. Formation of the substituted carbocations or silylium in situ occurs in a similar manner to stable salts, but within the vessel and at the desired temperature of polymerization. The advantage of the latter procedure is that it is capable of producing carbocations or silylium cations otherwise too unstable to be handled by the first method. The cation or the precursor to the cation is typically used in 1 to 1 ratios with the NCA, however ratios of 1 to 100 ($C^+$ or $Si^+$ to NCA) also work in the practice of this invention.

A novel aspect of this invention is the active carbocationic catalyst complex which is formed and which can be represented by the formulae:

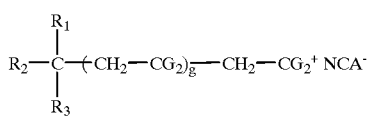

wherein each G is independently hydrogen or a hydrocarbyl group, preferably a $C_1$ to $C_{100}$ aliphatic group, and g is an integer representing the number of monomer units incorporated into the growing polymer chain, g being preferably a number greater than or equal to 1, preferably a number from 1 to about 150,000. $NCA^-$ is any non-coordinating anion as described above. All other symbols are as defined above.

Yet another novel aspect of this invention is the active carbocationic catalyst complex which is formed and which can be represented by the formulae:

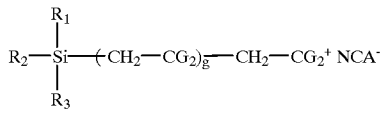

wherein each G is independently hydrogen or an aliphatic or aromatic group, preferably a $C_1$ to $C_{100}$ aliphatic group, and g is an integer representing the number of monomer units incorporated into the growing polymer chain, g being preferably a number greater than or equal to 1, preferably a number from 1 to about 150,000. NCA⁻ is any non-coordinating anion as described above. All other symbols are as defined above.

Germanium, Tin and Lead

In addition cationic compositions of germanium, tin or lead, may be used in combination with the NCA's described herein. Preferred compositions include those which are represented by the formula:

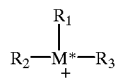

wherein $R_1$, $R_2$ and $R_3$ are hydrogen, alkyl, aryl, aralkyl groups or derivatives thereof, preferably $C_1$ to $C_{30}$ alkyl, aryl, aralkyl groups or derivatives thereof, and M* is Germanium, tin or lead, provided that only one of $R_1$, $R_2$ and $R_3$ may hydrogen. In a preferred embodiment the R groups are a $C_1$ to $C_{10}$ alkyl, preferably methyl, ethyl, propyl, or butyl. These compositions are combined with the NCA in ratios of 1:1 to 1:100.

Polymerization

The catalyst systems of this invention may be active as combined or may require activation prior to their use as polymerization catalysts. For example the cyclopentadienyl derivatives that are not in the cationic state may be combined with a compound comprising the NCA which acts with the cyclopentadienyl derivative to produce the active cationic catalyst.

In general, the active catalyst is combined with monomer in solution or slurry at temperatures below about 20° C., preferably below 0° C. according to the cationic polymerization processes known in the art.

Typical monomers which may be polymerized or copolymerized by this system include one or more of: olefins, alpha olefins, styrenic olefins, halogenated styrenic olefins, geminally substituted olefins, and other cationically polymerizable monomers, and or α-heteroatom olefins. Preferred olefins include isobutylene, isoprene, butadiene, styrene and the like. Preferred alpha olefins include alpha olefins having 2 to 30 carbon atoms, preferably 2 to 20 carbon atoms. Preferred alpha olefins include ethylene, propylene, butene, pentene, hexene, heptene, octene, nonene, decene, dodecene, dodecyldocecene, 3-methylpentene-1,3,5,5-trimethylhexene-1. Preferred styrenic monomers include unsubstituted styrene and alkyl styrenes, where the alkyl group contains up to about 60 carbon atoms, preferably 1 to 30 carbon atoms, even more preferably 1 to 8 carbon atoms. Examples include styrene, alpha-methyl styrene, para-chlorostyrene and para-methylstyrene and the like. Preferred geminally substituted olefins include isobutylene, 2-methylbutene, isoprene and the like. Preferred alpha-heteroatom olefins include alkyl vinyl ethers, and alkyl, alkenyl or aryl amines. Examples include methyl vinyl ether, isobutylvinyl ether, butyl vinyl ether, vinyl carbazole and the like.

Especially preferred monomers include isobutylene, 2-methyl-butene, 2-methyl-pentene, styrene, alpha-methylstyrene, para-methylstyrene, vinyl ether, vinyl carbazole or combinations thereof. A particularly preferred monomer combination is isobutylene combined with para-methyl styrene.

In another preferred embodiment, dienes polymerized as monomers or comonomers using the catalysts described above. The diene may be conjugated or non-conjugated; cyclic, branched or linear, and comprise up to 100 carbon atoms, even more preferably up to 20 carbon atoms. In a preferred embodiment isobutylene is copolymerized with isoprene and optionally a diene, preferably butadiene.

Depending on the choice of monomer and catalyst components, it is possible for a monomer to be polymerized coordinatively or cationically. Since the selected monomers will choose the path with lower energy requirements, an alpha-olefin might polymerize coordinatively with a cyclopentadienyl transition metal/NCA combination, even at low temperatures, but will polymerize cationically in the presence of a silylium compound/NCA combination. While styrene is known to typically polymerize by cationic mechanism, it is also known to polymerize by coordination mechanism. Thus in a situation where styrene is combined with the cyclopentadienyl derivative/NCA catalyst systems, the polymerization mechanism will be determined by the temperature of the polymerization. For Example, at temperatures of 20° C. or below the mechanism will be cationic, while at temperature of 50° C. or more the mechanism will be coordination.

Further when both coordination monomer and cationic monomer are present in a polymerization zone catalyst compositions comprising the cyclopentadienyl transition metal derivatives and the NCA will produce copolymers of the coordination monomer with the cationic monomer. Hence in a preferred embodiment, a composition is produced that comprises poly(cationic monomer), poly (coordination monomer) and copolymers of the coordination and cationic monomers. Indeed, with the catalyst system described above it is possible to produce a reactor blend having its own inherent compatibilizer.

The polymerization reaction may be run in typical cationic polymerization reactors and conditions known in the art at temperatures at or below about 20° C., more preferably below about 0° C., preferably below about −20° C., more preferably below about −60° C.

The polymerization is typically performed in a solution phase, slurry or low pressure reactor. The polymerization is typically complete in about 10 minutes, however, may run from less than one minute to greater than an hour. However, longer polymerization times are still within the scope of this invention.

In a preferred embodiment, the catalyst systems described herein may be used in the process used to produce the products modified and described in US Pat. No. 5,162,445, incorporated by reference herein.

Suitable solvents include both polar and non-polar hydrocarbons, such as haloaromatics, hexanes and heptanes, halogenated hydrocarbons, especially chlorinated hydrocarbons, and the like. Specific examples include, but are not limited to, methyl cyclohexane, ethyl cyclohexane, propyl cyclohexane, chloro-benzene, bromo-benzene, fluoro-benzene, iodo-benzene, methyl chloride, methylene chloride, ethyl chloride, propyl chloride, butyl chloride, chloroform and the like.

In a typical polymerization, a cation or cation source such as dimethylsilylmonocyclopentadienyl titanium dimethyl or biscyclopentadienyl zirconium dichloride is combined in a polymerization reactor with monomer and non-coordinating anion such as tris(pentafluorophenyl) boron or triphenylmethyltetra(pentafluorophenyl) boron in a solvent, having up to about $5.0 \times 10^{-3}$ mol/L of residual water. An optional proton scavenger may be present at concentrations equal to or less than the water concentration in the solvent. The reaction is then allowed to run for 30 seconds to over an hour at temperatures below the ceiling temperature of the selected monomer(s), preferably below about −15° C.

In preferred embodiments, a proton scavenger is used to control the concentration of the residual water in the solvent. As a general rule, it is preferred that when a cyclopentadienyl transition metal compound is used that the water is present at about $1 \times 10^{-4}$ mol/L or less. If more water is present, a proton scavenger can be used to control the water concentration, but for best results, the proton scavenger concentration should not be greater than the water concentration. For the purposes of this invention and the claims thereto a proton scavenger is defined to be a composition capable of reacting with free protons and not producing a new species of catalyst or if icataly produce a new species of catalyst, that catalyst is substantially inactive when compared to the catalyst system of this invention. Preferred proton scavengers are 2,6-di-tert-butylpyridine (DTBP), 4-methyl-2,6-di-tert-butyl-pyridine, 1,8-bis (dimethylamino)-naphthalene or diisopropylethylamine used alone or in combination. Additional information concerning different scavengers useful in these systems can be found in U.S. Pat. Nos. 5,153,157 and 5,241,025 which are incorporated by reference herein.

While not wishing to be bound by any theory, it is believed that the water acts with the cation and the NCA to help form the cationic catalyst. The amount of water preferred is dependent on the transition metal utilized. For example, the titanium cyclopentadienyl compounds appear to be adversely affected by greater water concentration while bis cyclopentadienyl zirconium compounds appear to be positively affected by greater water concentration. Hence, in a preferred embodiment low water concentrations, such as $1 \times 10^{-4}$ or less are used without a proton scavenger.

The process of this invention can produce polymers of cationically polymerizable monomers and can also polymerize traditional Zeigler-Natta polymerizable monomers ("coordination monomers). Hence, this invention can be used to produce reactor blends, interpenetrating networks and the like, of a coordination polymerized monomer and a cationically polymerized monomer by simply varying the reaction conditions and/or the monomers. The variety of reactor blends and interpenetrating networks that can be produced fills a lengthy list. For the sake of brevity the following table sets out some of the many monomers that can comprise the Ziegler-Natta polymer(s) (Group A) and which of the many monomers can comprise cationic polymer(s) (Group B) in a reactor blend or an interpenetrating network.

| Group A | Group B |
|---|---|
| $C_2$–$C_{100}$ alpha-olefins including, but not limited to: | Geminally disubstituted olefins including, but not limited to: |
| ethylene; | isobutylene; |
| propylene; | isopentene; |
| butene; | isoheptene; |
| pentene; | isohexane; |
| hexene | isooctene; |
| heptene | isodecene; |
| octene; | isododecene; |
| nonene; | and |
| decene; | alpha-heteroatom olefins including, but not limited to: |
| dodecene; | |
| tetradecene; | |
| hexadecene; | vinyl ether; |
| octadecene; | vinyl carbazole; |
| dodecyldodecene; | etc. and |
| 3-methyl-pentene-1; | styrenics, including but not limited to: |
| 3,5,5,-trimethylhexene-1; | |
| etc. | styrene; |

| Group A | Group B |
|---|---|
| | alkyl styrene; |
| | para-alkyl styrene; |
| | alpha-methyl styrene; |
| | chloro-styrene; |
| | bromo-para-methyl styrene; |
| | and the like. |

There are many possible choices of cation/NCA pairs and/or reaction conditions that will produce the desired reactor blends or interpenetrating networks. One simple, non-limiting example of the many choices is selecting a biscyclopentadienyl transition metal compound such as bis-cyclopentadienyl zirconium dimethyl and triphenylmethyl-perfluorophenyl boron as the catalyst system then contacting this system in a solvent with a cationically polymerizable monomer ("cationic monomer") such as isobutylene (at $-20°$ C., for example) then adding solvent with residual water and coordination monomer (as defined above) such as ethylene to the reactor. The resulting product will then be a reactor blend of polyethylene and polyisobutylene. Likewise, if the timing or flow is altered such that the monomer, such as ethylene or isobutylene, is polymerized into "blocks," blends of block copolymers can also achieved.

Many of the above combinations and processes will also benefit from the ability to use mixed monomer feeds. "Coordination" and "cationic" monomer can now be fed into the reactor in one stream and selectively polymerized by varying the reaction conditions, such as the catalyst, temperature and/or the amount of water present. Furthermore, as mentioned above, the cyclopentadienyl derivative catalysts can also produce copolymers of coordination monomer and cationic monomer. A preferred combination is a copolymer of isobutylene and ethylene. Other monomers can be selected from the table above to provide a great variety of these coordination-cationic copolymers.

In general, the cation combined with the NCA can be used to polymerize olefins, particularly geminally disubstituted olefins, and styrenics to high molecular weights, such as an Mn of 10,000 or more, preferably 100,000 or more.

All documents described herein, including testing procedures are incorporated by reference herein. In the following examples the materials prepared and the procedures followed relate to specific embodiments of the broad invention and while forms of the inventions have been illustrated and described, various modifications can be made without departing from the spirit and scope of this invention. Accordingly, it is not intended that the invention be limited thereby.

EXAMPLES

Molecular weight (Mw and Mn) were measured by Gel Permeation Chromatography using a Waters 150 gel permeation chromatograph equipped with a differential refractive index (DRI) detector. The numerical analyses were performed using the commercially available standard Gel Permeation Chromotography package, run on an HP1000 computer.

Example 1

Polymerizations were carried out under nitrogen in anhydrous solvents either directly as purchased or prepared in the laboratory by techniques known to those of ordinary skill in the art. Isobutylene was dissolved into a solvent(s) at $-20°$ C. along with proton scavenger (DTBP) di-tert-butyl-pyridine in some polymerizations before adding the catalyst with stirring. The catalyst was prepared by separately dissolving each component in a solvent of choice and mixing them together. The resulting solution was immediately introduced into the polymerization vessel. Polymerizations were run for a predetermined time and were quenched with methanol addition. Product polymer was isolated by precipitation into methanol. The basic recipe for the polymerization included 10 ml of solvent(s), 10 ml of isobutylene and $4.4 \times 10^{-5}$ moles of the catalyst. The catalyst was introduced in approximately 5 to 8 ml of additional solvent.

A) Polymerization with a Monocyclopentadienyl Derivative and a Non-coordinating Anion The polymerizations were run according to the procedure described above. The individual run conditions are reported in Table 1 and the results are reported in Table 2.

TABLE 1

| Rxn # | Cp*TiMe₃ (mg) | B(pfp)₃ (mg) | DTBP (μl) | Solvent | Time (min) |
|---|---|---|---|---|---|
| 94-4 | 10 | 32 | — | Toluene | 30 |
| 96-1 | 10 | 32 | — | MCH | 30 |
| 96-2 | — | 32 | — | MCH | 30 |
| 96-4 | 10 | — | — | ClBz | 30 |
| 97-2 | — | 32 | — | ClBz | 30 |
| 97-4 | — | 22 | 200 | ClBz | 30 |
| 96-3 | 10 | 32 | — | ClBz | 30 |
| 97-1 | 10 | 32 | 8 | ClBz | 30 |
| 97-3 | 10 | 22 | 200 | ClBz | 30 |
| 97-6 | 10 | 22 | — | ClBz/MCH (80/20) | 40 |
| 97-7 | 10 | 22 | — | ClBz/MCH (60/40) | 60 |
| 97-8 | 10 | 22 | — | ClBz/MCH (50/50) | 135 |
| 97-9 | 10 | 22 | — | ClBz/MCH (50/50) | 135 |

TABLE 1-continued

| Rxn # | Cp*TiMe₃ (mg) | B(pfp)₃ (mg) | DTBP (μl) | Solvent | Time (min) |
|---|---|---|---|---|---|

Solvents mixed volume to volume
Cp*TiMe₃ 1,2,3,4,5-(pentamethyl)cyclopentadienyl titanium (IV) trimethyl
B(pfp)₃ tris(pentafluorophenyl) boron
DTBP di-tert-butyl-pyridine
ClBz chlorobenzene
MCH methylcyclohexane
— indicates an absence of this compound.

TABLE 2

| Rxn # | Yield (%) | Mn | Mw/Mn |
|---|---|---|---|
| 94-4 | 13 | 75,000 | 2.3 |
| 96-1 | 0 | ND | ND |
| 96-2 | 0 | ND | ND |
| 96-4 | 0 | ND | ND |
| 97-2 | 10 | ND | ND |
| 97-4 | 0 | ND | ND |
| 96-3 | 79 | 38,400 | 2.7 |
| 97-1 | 77 | 68,800 | 1.76 |
| 97-3 | 72 | 90,700 | 1.9 |
| 97-6 | 82 | 108,300 | 1.67 |
| 97-7 | 42 | 125,800 | 1.65 |
| 97-8 | 56 | 124,500 | 1.60 |
| 97-9 | 15 | 117,300 | 1.56 |

ND INDICATES NO DATA

B) Polymerization with a Biscyclopentadienyl Derivative and an NCA

The polymerizations were run according to the procedure above in chlorobenzene solvent. The individual conditions and data are reported in Table 3.

TABLE 3

Isobutylene Polymerizations at −20° C. in Chlorobenzene

| RXN | Catalyst | [Metal] × 10³ (mol/L) | [H₂O] × 10³ (mol/L) | [DTBP] × 10³ (mol/L) | Time (min) | Isolated Yield (%) | Mn × 10³ | Mw/Mn |
|---|---|---|---|---|---|---|---|---|
| 131-3 | Cp*₂ZrMe₂ | 1.28 | ND | — | 45 | 63 | 132 | 1.8 |
| 131-4 | Cp*₂ZrMe₂ | 1.28 | ND | 22.0 | 45 | 0 | ND | ND |
| 131-6 | Cp*₂ZrMe₂ | 2.55 | ND | — | 45 | 75 | 92 | 2.1 |
| 134-1 | Cp*₂ZrMe₂ | 9.2 | 3.15 | 44.5 | 45 | 20 | 162.2 | 1.8 |
| 135-1 | Cp*₂ZrMe₂ | 4.85 | 4.5 | — | 45 | 60 | 141.1 | 1.9 |
| 143-3 | Cp*₂ZrMe₂ | 1.28 | 0.03 | — | 60 | 86 | 116.0 | 1.9 |
| 148-2 | Cp*₂ZrMe₂ | 1.28 | 0.08 | 2.7[a] | 120 | 24 | 147.0 | 1.8 |
| 147-3 | Cp*₂ZrMe₂ | 1.28 | 0.08 | — | 60 | 37 | 136.1 | 1.8 |
| 145-5[b] | Cp*₂ZrMe₂ | 1.28 | 0.08 | — | 60 | 13 | 273 | 2.3 |
| 134-5 | (Me₂Si(THI)₂)ZrMe₂ | 1.53 | 3.15 | — | 90 | 72 | 6.6 | 4.97 |
| 145-1 | (Me₂Si(THI)₂)ZrMe₂ | 1.53 | 0.03 | — | 90 | 44 | 182.0 | 1.8 |
| 131-5 | Cp*₂HfMe₂ | 1.53 | ND | — | 90 | 44 | 150.0 | 1.8 |
| 133-1 | Cp*₂HfMe₂ | 2.53 | 3.15 | 44.5 | 45 | trace | ND | ND |
| 144-3 | Cp*₂HfMe₂ | 1.53 | 0.03 | — | 90 | 29 | 182 | 1.7 |
| 133-3 | Cp*₂HfMe₂ | 1.53 | 3.15 | — | 90 | trace | ND | ND |
| 147-4 | Cp*₂HfMe₂ | 1.5 | 0.08 | — | 60 | 83 | 100.3 | 1.82 |
| 147-6[b] | Cp*₂HfMe₂ | 1.5 | 0.08 | — | 60 | 47 | 292.1 | 2.2 |

ND not determined;
— indicates that component was not present;
Cp cyclopentadienyl
Cp* pentamethylcyclopentadienyl
Me methyl
THI tetrahydroindenyl
DTBP 2,6 di-tert-butyl pyridine
[a]isobutylene added 3 minutes after all ingredients have been added
[b]Temp. was −40° C.
Cp*₂ZrMe₂ is bis(pentamethylcyclopentadienyl) zirconium dimethyl.

Additional polymerizations were run according to the procedure listed above, except that toluene was used as the solvent. The data and conditions are reported in Table 4

TABLE 4

Isobutylene Polymerizations at −20° C. in Toluene

| RXN | Catalyst | [Cat] × 10³ (mol/L) | [H₂O] × 10³ (mol/L) | [DTBP] × 10³ (mol/L) | Time (min) | Isolated Yield (%) | Mn × 10³ | Mw/Mn |
|---|---|---|---|---|---|---|---|---|
| 153-1 | Cp*₂ZrMe₂ | 1.28 | <0.1 | — | 45 | 26 | 96.7 | 2.1 |
| 153-6 | Cp*₂ZrMe₂ | 1.28 | <0.1 | — | 45 | 10 | 133.9 | 1.68 |
| 153-2 | Cp₂HfMe₂ | 1.47 | <0.1 | — | 45 | 56 | 131.4 | 1.89 |
| 153-3 | (Me₂Si(THI)₂)ZrMe₂ | 1.56 | <0.1 | — | 45 | 18 | 124.1 | 1.74 |

Cp cyclopentadienyl
Cp* pentamethylcyclopentadienyl
Me methyl
THI tetrahydroindenyl
— none present C) Polymerization with Substituted Carbocations The Polymerizations were run according to the general procedure described above except that 5 ml of isobutylene and 65 ml of methylene chloride(table 6) or chlorobenzene (table 5) (having $1.4 \times 10^{-3}$ mol/L H₂O) were mixed and cooled to −20° C. 83 mg of triphenylmethyl tetrafluorophenylboron were dissolved into 2 ml of methylene chloride and added to the first solution. Polymerization immediately ensued and was allowed to run for 60 minutes. The polymerization was then stopped by quenching with an excess of methanol. The data and conditions are reported in table 5 & 6.

TABLE 5

Isobutylvinylether Polymerizations at −20° C. in Chlorobenzene

| RXN | Catalyst | [Cat] × 10³ (mol/L) | [H₂O] × 10³ (mol/L) | [DTBP] × 10³ (mol/L) | Time (min) | Isolated Yield (%) | Mn × 10³ | Mw/Mn |
|---|---|---|---|---|---|---|---|---|
| 154-1 | Cp*₂ZrMe₂ | 1.28 | 0.08 | — | 45 | 85 | 5.4 | 7.69 |
| 154-2 | (Me₂Si(THI)₂)ZrMe₂ | 1.56 | 0.08 | — | 45 | 85 | 6.7 | 8.8 |
| 155-1 | Cp*₂ZrMe₂ | 1.28 | 0.08 | 3.3 | 90 | 21 | 28.3 | 4.02 |
| 155-4 | Cp*₂ZrMe₂ | 1.28 | 0.08 | — | 90 | 58 | 3.8 | 4.05 |
| 155-2 | Cp₂HfMe₂ | 1.28 | 0.08 | — | 90 | 78 | 4.8 | 8.75 |

Cp cyclopentadienyl
Cp* pentamethylcyclopentadienyl
Me methyl
THI tetrahydroindenyl
— none present

TABLE 6

ISOBUTYLENE POLYMERIZATIONS CATALYZED BY Ph₃C⁺B(pfp)₄⁻

| RXN | [M] mol/L | [Cat.] × 10³ mol/L | [H₂O] × 10³ mol/L | Time (min) | Temp (° C.) | Isolated Yield (%) | Mn × 10³ | Mw/Mn |
|---|---|---|---|---|---|---|---|---|
| 136-1 | 0.97 | 1.38 | 1.4 | 60 | −20 | 66 | 24.5 | 2.5 |
| 136-2 | 0.32 | 1.38 | 1.4 | 60 | −20 | 16 | 3.2 | 7.1 |
| 137-2[a] | 0.97 | 1.38 | 1.4 | 60 | −20 | trace | ND | ND |
| 138-1[b] | 0.97 | 5.56 | 1.4 | 60 | −20 | 4 | ND | ND |
| 138-2[c] | 0.97 | 5.56 | 1.4 | 60 | −20 | trace | ND | ND |
| 140-4 | 0.97 | 5.56 | ND | 60 | −20 | 61 | 6.3 | 2.1 |
| 143-6 | 6.3 | 1.95 | 0.03 | 60 | −20 | 18 | 3.3 | 8.3 |
| 147-2 | 6.3 | 0.72 | 3.5 | 60 | −20 | 30 | 9.9 | 2.08 |
| 134-2 | 6.3 | 1.3 | 6.3 | 60 | −20 | 56 | 12 | 2.29 |
| 147-8 | 6.3 | 0.72 | 0.08 | 60 | −40 | 9 | 41.3 | 1.5 |
| 147-1 | 6.3 | 0.72 | 3.5 | 60 | −20 | 30 | 9.4 | 2.1 |
| 152-4[d] | 6.3 | 1.3 | 0.08 | 60 | −20 | 52 | 1.5 | 7.0 |
| 152-3[e] | 6.3 | 1.3 | 0.08 | 60 | −20 | 53 | 5.7 | 2.45 |

[a]Ph₃COH added in $4.1 \times 10^{-4}$ mol/L
[b]2,6-dibutylpyridine added in $2.2 \times 10^{-3}$ mol/L
[c]Ph₃CCL added in $1.4 \times 10^{-3}$ mol/L
[d]Phenol added in $2.1 \times 10^{-3}$ mol/L
[e]Methanol added in $1.2 \times 10^{-3}$ mol/L
ND no data Additional polymerizations were conducted according to the procedure listed in Example 1. The individual conditions and data are reported in table 7. All the reactions were run at −80° C., except 2-1 and 2-2 which were run at −20° C.

E) Ethylene/Isobutylene Copolymerization with $Cp_2HfMe_2$ & $Ph_3CB(PfP)_4$

The polymerization was run at −20° C. in a stirred Parr reactor. Isobutylene (20 ml) was dissolved into 40 ml of

TABLE 7

Isobutylene Polymerizations initiated by $R_3C^+B(pfp)_4^-$

| RXN | Initiator[b] | [M] × 10³ (mol/L) | [I] × 10³ (mol/L) | [Li][a] × 10³ (mol/L) | Sol[c] | Isol'td Yield (%) | Mn × 10³ | Mw/Mn |
|---|---|---|---|---|---|---|---|---|
| 36-4[d] | TBDCC | 3.8 | 2.0 | 4.3 | $CH_2Cl_2$ | 100 | 8.77 | 20.82 |
| 36-5 | TBDCC | 1.9 | 2.0 | 4.3 | $CH_2Cl_2$ | 100 | 87.12 | 10.9 |
| 159-1 | TBDCC | 1.9 | 1.9 | 3.8 | m60/40 | 96 | 53.7 | 4.8 |
| 159-2 | TBDCC | 1.9 | 1.9 | 3.8 | m60/40 | 96 | ND 47.2 | 5.0 |
| 159-3[e] | TBDCC | 1.9 | 1.9 | 3.8 | m60/40 | 73 | 15.7 | 2.4 |
| 159-4[f] | TBDCC | 1.9 | 1.9 | 3.8 | m60/40 | 86 | 7.54 | 3.7 |
| 160-1 | TMPCl | 1.9 | 1.7 | 1.9 | m60/40 | 92 | 1980.2 | 2.5 |
| 160-2 | TBDCC | 1.9 | 1.9 | 3.8 | m60/40 | 87 | 2.8 | 1.9 |
| 162-4[g] | TBDCC | 6.3 | 6.3 | 12.6 | $CH_2Cl_2$ | 81 | 2.18 | 3.3 |
| 162-5[h] | TBDCC | 6.3 | 6.3 | 12.6 | $CH_2Cl_2$ | ND | ND | ND |
| 162-6[i] | TBDCC | 6.3 | 6.3 | 12.6 | $CH_2Cl_2$ | 61 | 18.5 | 6.2 |
| 164-1 | TBDCC | 1.9 | 1.9 | 3.8 | MCH | 85 | 67.6 | 2.96 |
| 164-2[f] | TBDCC | 1.9 | 1.9 | 3.8 | MCH | 28 | 12.5 | 5.0 |
| 2-1 | PIB-2000 | 1.9 | 1.9 | 3.8 | m60/40 | 94 | 28.0 | 3.3 |
| 2-2 | TBDCC | 1.9 | 1.9 | 3.8 | m60/40 | 99 | 4.7 | 6.0 |
| 3-1 | BzBr | 2.5 | 1.9 | 2.5 | $CH_2Cl_2$ | 59 | 2313.8 | 2.6 |
| 3-2 | $BzNO_2Br$ | 2.5 | 1.9 | 1.9 | $CH_2Cl_2$ | 8 | 2900. | 1.93 |
| 3-3 | TBDCC | 1.9 | 1.9 | 7.6 | MCH | 100 | 52.2 | 3.8 |
| 3-5 | TBDCC | 1.8 | 1.8 | 3.75 | m70/30 | 96 | 30.5 | 5.6 |
| 3-6 | TBDCC | 1.8 | 1.8 | 3.75 | m57/43 | 85 | ND | ND |
| 42-4 | — | 1.9 | — | 3.8 | mx60:40 | 17 | 1606.7 | 2.0 |

— none present,
ND no data available,
[a]lithium tetraperfluorophenylboron;
[b]TBDCC - 1,3-bis(1-chloro-1methylethyl)-5-tert-butylbenzene, TMPCl - 2-chloro-2,4,4-trimethylpentane, PIB-2000 - α,ω-t-chloro polyisobutylene whose Mn is 2000, BzBr - benzyl bromide, $BzNO_2Br$ - —o-nitrobenzylbromide;
[c]MCH = methylcyclohexane, $CH_2Cl_2$ = methyldichloride m = mix of (MCH)/($CH_2Cl_2$), numbers indicate volume percent in solution; mx = mix of (hexanes)/($CH_2Cl_2$), numbers indicate volume percent in solution
[d]sequential addition of 5 ml of monomer after 5 minutes;
[e]10 Mol % of β-pinene in the feed;
[f]10 Mol % isoprene in the feed;
[g]β-pinene homopolymerization;
[h]10 Mol % p-methylstyrene in the feed;
[i]sequential addition of 3 ml of p-methylstyrene after 5 minutes;
[j]10 Mol % 4-vinylcyclohexene in the feed.

The polymerizations ran for 30 to 60 minutes.

D) Polymerizations with a Substituted Sylium

The polymerizations were carried out as described above for 10 minutes and except as otherwise noted. The individual conditions and data are reported in table 8.

dried, anhydrous chlorobenzene directly in the reactor. The reactor was sealed and thermostated in a both at −20° C. Separately the catalyst was prepared and activated by separately dissolving 10 milligrams of $Cp_2HfMe_2$ and 19 milligrams of $Ph_3CB(pfp)_4$ into 2 ml of solvent each and then

TABLE 8

ISOBUTYLENE POLYMERIZATIONS WITH $Et_3Si^+B(pfp)_4^-$

| RXN | [M] mol/L | [Cat] × 10³ mol/L | Solvent | Temp (° C.) | Isolated Yield (%) | Mn × 10³ | Mn/Mw |
|---|---|---|---|---|---|---|---|
| 120-1 | 6.3 | 11.0 | MCH | −20 | 54 | 700 | 2.7 |
| 120-2 | 6.3 | 11.0 | MCH | −20 | 48 | .9 | 2.7 |
| 120-3 | 12.6 | trace | neat | −20 | 100 | 21.4 | 3.2 |
| 121-1 | 6.3 | 9.4 | MCH | −20 | ND | 2.1 | 6.6 |
| 123-1 | 6.3 | 4.2 | MCH | −20 | <1 | ND | ND |
| 123-2 | 6.3 | 2.77 | MCH | −80 | 6 | 115.9 | 4.6 |
| 123-3 | 6.3 | 2.7 | ClBz | −45 | 100 | 5.9 | 13.1 |
| 129-1[b] | 6.3 | 1.26 | MP | −20 | 73 | 77.8 | 1.75 |

ND no data available,
MCH methylcyclohexane
ClBz chlorobenzene
MP methylpropane
[b]5-t-butyl-bis-1,3(1-chloro-1-methylethyl)benzene.

combining the solutions. The activated catalyst solution was then added to the stirred reaction vessel. Polymerization of isobutylene ensued and was allowed to continue for a pre-determined time ($T_1$). The reactor was then pressurized to 60 psi (414 kPa) with ethylene. Reactions were allowed to continue maintaining this pressure for a time ($T_2$). The reaction was then quenched with the addition of methanol. The polymer mass was isolated by precipitating with methanol, washing and drying in vacuo. After analysis of Molecular Weight and composition by proton NMR, the samples were extracted according to the schemes below.

TABLE 9

| RXN | Catalyst | [Catalyst] M/L × 10$^4$ | [H$_2$O] M/L × 10$^3$ | T$_1$ (min) | T$_2$ (min) | Yield (grams) |
|---|---|---|---|---|---|---|
| 158-3 | Cp$_2$HfMe$_2$ | 7.6 | 0.08 | 10 | 4 | 9.78 |
| 158-1 | Cp*$_2$ZrMe$_2$ | 6.4 | 0.08 | 15 | 30 | 11.0 |

Cp = cyclopentadienyl
Cp* = pentamethylcyclopentadienyl
Me = methyl

TABLE 10

| RXN | Mn | Mw/Mn | modality | 1H-NMR wt. % PIB | 1H-NMR wt. % PE |
|---|---|---|---|---|---|
| 158-3 | 9740 | 11.8 | 2 | 84 | 16 |
| 158-1 | 74,000 | 8.0 | 2 | 85 | 15 |

The extraction scheme 1 for sample 158-3 was as follows.

0.6092 grams of the sample 158-3 was treated with hot methylcyclohexane and divided into two fractions. Fraction A, the hot methylcyclohexane insoluble portion, was found by $^1$H-NMR to show only polyethylene peaks and comprised 12.7 wt % of the original sample. Fraction B, the hot methylcyclohexane soluble portion, was found to show both polyethylene and polyisobutylene $^1$H-NMR peaks and comprised 87.3 wt. % of the original sample. Fraction B was then treated with room temperature chloroform and separated into two fractions. Fraction C, the chloroform insoluble fraction, was found to show both polyethylene and polyisobutylene $^1$H-NMR peaks. Fraction D, the chloroform soluble fraction, was found to contain only polyisobutylene $^1$H-NMR peaks. The $^1$H-NMR for fraction C is FIG. 1. From these data, it is concluded that Fraction A contains polyethylene, Fraction B contains polyethylene, polyisobutylene and a copolymer of ethylene and isobutylene, Fraction C contains ethylene-isobutylene copolymer and fraction D contains polyisobutylene.

Figure 2:
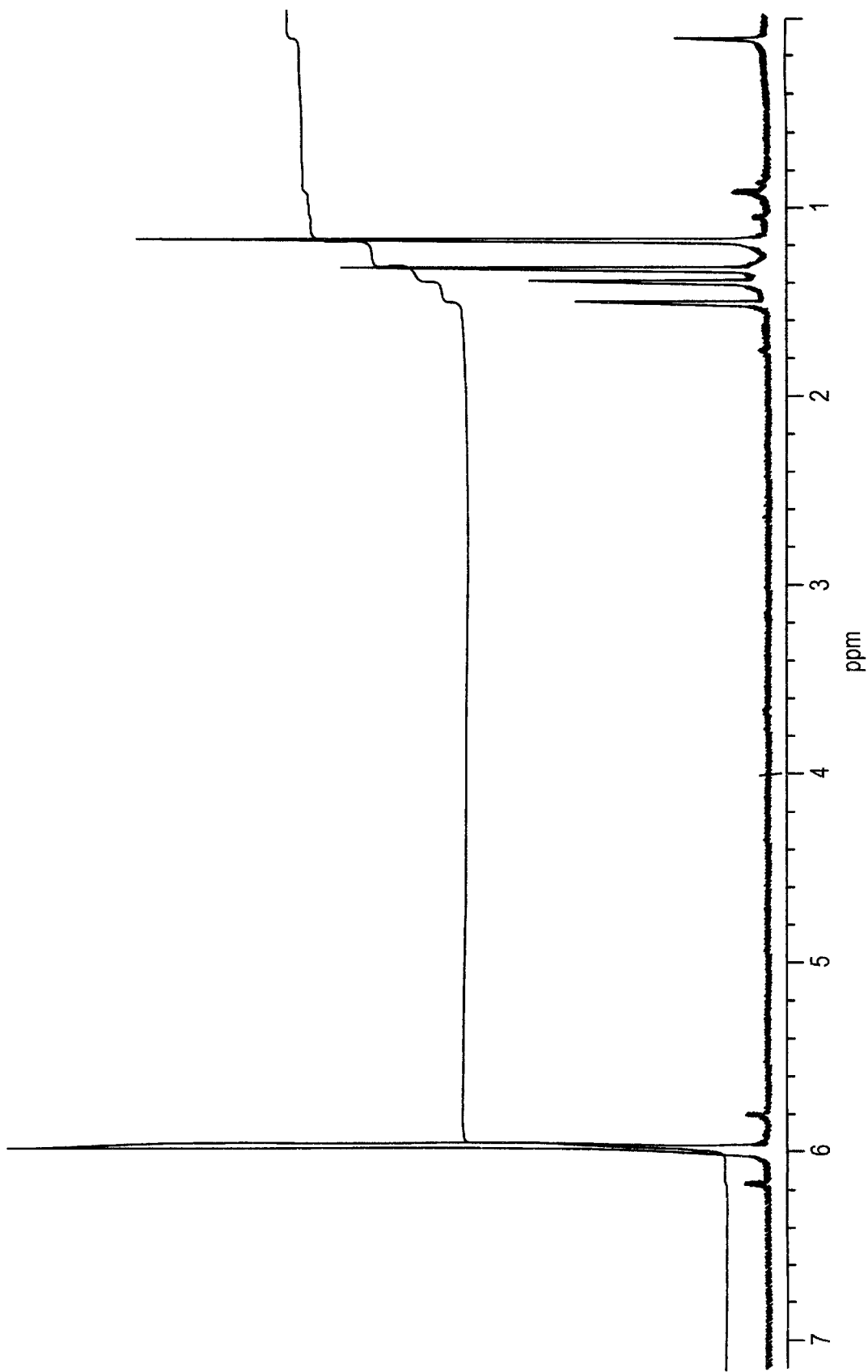
FIG. 2 is a $^1$H-NMR of Fraction 4 of samples 158-3 & 158-1.

The extraction scheme for samples 158-3 and 158-1, performed separately was as follows:

The crude sample was treated to hot hexanes. The hot hexane insoluble portion, Fraction 1, was found by $^1$H-NMR to show only polyethylene signals. The hot hexanes soluble portion, Fraction 2, was found by $^1$H-NMR to show both polyethylene and polyisobutylene signals. Fraction 1 was then further subjected to hot methylcyclohexane. Both the insoluble portion and the soluble portion, Fractions 3 and 5 respectively, were found by $^1$H-NMR to show only polyethylene signals. Fraction 2 was subjected to room temperature hexane (room temperature chloroform could be substituted here). The hexane(/chloroform) insoluble portion, Fraction 4, was found by $^1$H-NMR to show both polyethylene and polyisobutylene signals. The hexane/chloroform soluble portion, Fraction 6, was found to only show polyisobutylene signals. FIG. 2 is the $^1$H-NMR for Fraction 4. Further information about the extraction is presented in table 11.

TABLE 11

| | Fraction 3 | | Fraction 4 | | Fraction 5 | | Fraction 6 | |
|---|---|---|---|---|---|---|---|---|
| Sample | Wt. % | Pol*. | Wt. % | Pol*. | Wt. % | Pol*. | Wt. % | Pol*. |
| 158-3 | 1.7 | PE | 1.3 | PE, PIB-PE | 19 | PE | 78 | PIB |
| 158-1 | 17.2 | PE | 0 | 0 | 11.6 | PE | 71.2 | PIB |

Pol*. = polymers present in the fraction.

Discussion

This invention demonstrates that many new, and heretofore unknown, carbocationic polymerization possibilities exist, including combining a reactive cationic source such as a metallocene with a non-coordinating anion and obtaining a combination capable of initiating cationic polymerization of olefins. Since polymer molecular weight and polymerization attributes are typically dependent upon the nature of the reactive cation source in a cationic polymerization, this invention also provides new methods to obtain new combinations of good molecular weight with other polymerization attributes, such as, but not limited to, yield, molecular weight distribution, conversion and the like. These combinations were not possible with the traditional Lewis acid based systems.

Cationic polymerization of isobutylene and other cationically polymerizable monomers, such as isobutylvinylether, via transition metal derivatives and non-coordinating anions is demonstrated in Tables 1, 2, 3, 4 and 5. (This form of initiation can also be extended to other traditional cationic monomers described in H.-G. Elias in *Macromolecules* (Plenum Press, 1984, Vol. 2, p. 641f.)) Furthermore, not only do these catalyst systems polymerize cationically, they are also capable of generating unexpectedly high molecular weight polyisobutylenes at temperatures higher than typically used for known Lewis acid systems. Note that polymerizations in Table 4 are run at −20° C. yet still obtain excellent number average and weight average molecular weights ($M_w = M_n \times M_w/M_n$). Few other catalysts can obtain this performance at this temperature. See J. P. Kennedy in *Cationic Polymerization of Olefins: A Critical Inventory* (J. Wiley & Sons, 1975, p. 130, et seq.) for evidence that demonstrates that few other catalysts exceed the performance of this invention. Furthermore, few of these known catalysts found in Kennedy's book are homogenous and as chemically simple as this invention.

As previously indicated, controlled polymerizations of monomers only capable of cationic polymerization, have not previously been catalyzed by monocyclopentadienyl or biscyclopentadienyl transition metal derivatives alone or in combination with an activator. The use of the non-coordinating anion with the transition metal derivative makes cationic polymerization possible from these typical coordination catalysts. The biscyclopentadienyl transition metal compounds used in this invention are known to catalyze the coordination polymerization of olefin monomers like ethylene. Ethylene, however, is a poor cationic monomer and is not expected to polymerize cationically in the presence of these catalysts. Since the ability of these catalysts to polymerize isobutylene and isobutylvinylether, traditional cationic monomers, has been demonstrated, the duality of these catalysts toward both cationic and coordination polymerization has been revealed. Thus, provided that appropriate conditions are used for the selected monomer set, it is possible for one catalyst to polymerize both monomer types in one reactor. Furthermore depending on the catalyst and conditions selected, blends or copolymers of the two different classes of monomers can be made.

One of the many facets of the dual nature of a preferred embodiment of this invention is demonstrated in Tables 9, 10 and 11 where a copolymer of ethylene and isobutylene is shown. Evidence that a copolymer of ethylene and isobutylene has been produced is provided by solvent extraction data. Extraction and analysis of the products indicate whether a blend or a copolymer or a mixture of the two is prepared during a reaction. The data presented here indicate that both blends and copolymer formation are possible. This accomplishment has been heretofore unknown.

This invention also demonstrates that proton initiation of cationic monomer polymerization by action of a stable cation salt of a Lewis acid metal halide with a proton source, such as water, alcohols, etc. is possible when the stable cation salt contains a non-coordinating anion as is demonstrated in Table 6. While, reactions of water with stable cation salts are known (A. Ledwith and D. C. Sherrington, Adv. Polym. Sci., 19, 1(1973), they are not known to lead to the polymerization of isobutylene. This invention's use of a non-coordinating anion permits initiation of isobutylene from a water borne proton thus providing the key element necessary for making this reaction an initiation step for isobutylene polymerization. This conclusion is supported by the data in Experiments 136-1, 136-2, and 143-6, 147-2, 134-2 which demonstrate that an increase in monomer concentration or water concentration increases the overall yield. This indicates that both "water" and monomer are being consumed in the polymerization reaction. Experiments 137-2 and 138-2 demonstrate that increasing the byproduct concentration ($Ph_3COH$) or introducing a common salt ($Ph_3CCl$) with poorer dissociative properties, inhibits the initiation of isobutylene, i.e. the by product drives the equilibrium to the left tying up more of the protons so that less of NCA is balanced with a free proton. Thus proton initiation of a cationic polymerization is now possible by using the non-coordinating anions as described herein.

In addition this invention also provides for a method to initiate cationic polymerization by in situ formation of a carbocationic initiation site. For example, reaction of the lithium salt of the NCA with an active organic halide (defined as one that will provide a relatively stable carbocation such as benzylic, allylic, t-alkyl, etc.) will produce an active catalyst site that will polymerize cationic monomers. Similar reactions to cause initiation of carbocationic polymerization by reacting an organic halide with a metal salt of a Lewis acid metal halide are known, however, the reaction is usually a poor initiator providing poor yields unless a silver salt of the Lewis acid salt is used (e.g. $AgBF_4$). Silver salts were used to ensure complete reaction by the precipitation of the silver halide (usually chloride or bromide) salt. Likewise, lower metal salts, like alkali and alkaline earth's, are generally incapable of providing complete reaction for initiation. This is especially the case for lithium salts. Thus it is unexpected to find that the lithium salt of a NCA is so efficient at causing initiation of isobutylene polymerization using this technique. Indeed in most cases, yields obtained using the lithium salt/NCA combination are quite high and molecular weight over the entire spectrum can be prepared by selecting solvent and temperature conditions as well as the concentrations of monomer and the two components of the initiator (organic halide and lithium salt of the NCA).

Finally, Table 8 demonstrates yet another method to initiate cationic polymerization using NCA's. In Table 8 the NCA concept is applied to initiation from silylium salts. Relatively stable silylium salts are relatively new chemical compounds (C&EN, Nov. 8, 1993, p.41) and it is unexpected that these salts will polymerize olefins. This invention however provides a silylium composition that catalyzes a virtually terminationless polymerization. When combined with NCA's the silylium salts in polar solvents or in neat isobutylene, these polymerizations are "terminationless" as defined by D. C. Pepper and P. J. Reilly for styrene polymerization (Proced. Royal Soc. Chem., Ser. A, .291, 41 (1966)). In other words, once the first monomer charge is consumed, further addition of monomer continues the polymerization and results in complete consumption of the second batch. This process may be continued until either a contamination is brought into the reactor or the reaction is purposefully quenched. A terminationless polymerization catalyst system for cationic monomers, particularly isobutylene polymerization has not been previously known.

All documents described herein are incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby.

I claim:

1. A process for the polymerization of cationically polymerizable olefins comprising contacting under polymerization conditions one or more olefins with a catalyst comprising:

a cation, and a compatible non-coordinating anion. wherein said cation is selected from the compounds represented by the following formula:

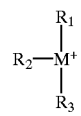

wherein M is germanium, tin or lead, and $R_1$, $R_2$ and $R_3$ are independently hydrogen, or linear, branched or cyclic aromatic or aliphatic groups, provided that only one of $R_1$, $R_2$ or $R_3$ may be hydrogen.

2. The process of claim 1 wherein the compatible non-coordinating anion is triphenylmethyltetraperfluorophenylboron or tris(pentafluorophenyl) boron.

3. The process of claim 1 further comprising a proton scavenger.

4. The process of claim 3 wherein the proton scavenger is one of 2-6-di-tert-butylpyridine, 4-methyl-2,6-di-tert-butylpyridine, 1,8-bis(dimethylamino)-naphthalene, diisopropylethylamine or mixtures thereof.

5. The process of claim 1 wherein the ratio of number of moles of cation source to the number moles of non-coordinating anions is about 1 to 1.

6. The process of claim 1 wherein the polymerization conditions comprise a temperature of less than 0° C.

7. The process of claim 1 wherein the polymerization conditions comprise a temperature of −30° C. or less.

8. The process of claim 1 wherein the polymerization conditions comprise a temperature less than about −60° C.

9. The process of claim 1 wherein the olefin comprises two different cationically polymerizable olefins.

10. The process of claim 1 wherein the olefin is geminally substituted.

11. The process of claim 10 wherein the olefin comprises isobutylene.

12. The process of claim 1 wherein each R group has 1 to 8 carbon atoms.

13. A process for the polymerization of cationically polymerizable olefins comprising contacting under polymerization conditions one or more olefins with a catalyst comprising:

a cation, and a compatible non-coordinating anion, wherein said cation is represented by the formula:

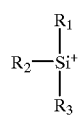

wherein $R_1$, $R_2$ and $R_3$ are independently hydrogen, or linear, branched or cyclic aromatic or aliphatic groups, provided that only one of $R_1$, $R_2$ or $R_3$ may be hydrogen.

14. The process of claim 13 wherein the compatible non-coordinating anion is triphenylmethyltetraperfluorophenylboron or tris(pentafluorophenyl) boron.

15. The process of claim 13 further comprising a proton scavenger.

16. The process of claim 14 wherein the proton scavenger is one of 2-6-di-tert-butylpyridine, 4-methyl-2,6-di-tert-butyl-pyridine, 1,8-bis(dimethylamino)-naphthalene, diisopropylethylamine or mixtures thereof.

17. The process of claim 13 wherein the ratio of number of moles of cation source to the number moles of non-coordinating anions is about 1 to 1.

18. The process of claim 13 wherein the polymerization conditions comprise a temperature of less than 0° C.

19. The process of claim 13 wherein the polymerization conditions comprise a temperature of −30° C. or less.

20. The process of claim 13 wherein the polymerization conditions comprise a temperature less than about −60° C.

21. The process of claim 13 wherein the olefin comprises two different cationically polymerizable olefins.

22. The process of claim 13 wherein the olefin is geminally substituted.

23. The process of claim 22 wherein the olefin comprises isobutylene.

24. The process of claim 13 wherein each R group has 1 to 8 carbon atoms.

25. A process for the polymerization of cationically polymerizable olefins comprising contacting under polymerization conditions one or more olefins with a catalyst comprising:

a cation represented by the formula:

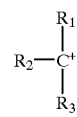

wherein $R_1$, $R_2$ and $R_3$ are independently hydrogen, or linear, branched or cyclic aromatic or aliphatic groups, provided that only one of $R_1$, $R_2$ or $R_3$ may be hydrogen; and a compatible non-coordinating anion represented by the formula:

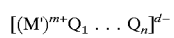

wherein:

M' is a metal or metalloid;

d is an integer greater than or equal to 1;

$Q_1$ to $Q_n$ are, independently, bridged or unbridged hydride radicals, dialkylamido radicals, alkoxide and aryloxide radicals, hydrocarbyl and substituted-hydrocarbyl radicals, halocarbyl and substituted-halocarbyl radicals and hydrocarbyl and halocarbyl-substituted organometalloid radicals and any one, but not more than one of $Q_1$ to $Q_n$ may be a halide radical;

m is an integer representing the formal valence charge of M; and n is the total number of ligands Q.

26. The process of claim 25 wherein each R group has 1 to 8 carbon atoms.

27. The process of claim 25 wherein the compatible non-coordinating anion is triphenylmethyltetraperfluorophenylboron or tris(pentafluorophenyl) boron.

28. The process of claim 25 further comprising a proton scavenger.

29. The process of claim 28 wherein the proton scavenger is one of 2,6-di-tert-butylpyridiene, 4-methyl-2,6-di-tert-butyl-pyridine, 1,8-bis(dimethylamino)-naphthalene, diisopropylethylamine or mixtures thereof.

30. The process of claim 25 wherein the polymerization conditions comprise a temperature less than about −60° C.

31. The process of claim 25 wherein the ratio of number of moles of cation source to the number moles of non-coordinating anions is about 1 to 1.

32. The process of claim 25 wherein the polymerization conditions comprise a temperature of less than 0° C.

33. The process of claim 25 wherein the polymerization conditions comprise a temperature of −30° C. or less.

34. The process of claim 25 wherein the olefin is geminally substituted.

35. The process of claim 25 wherein the olefin comprises two different cationically polymerizable olefins.

36. The process of claim 25 wherein the olefin comprises isobutylene.

* * * * *